United States Patent [19]
Keitel et al.

[11] 3,762,546
[45] Oct. 2, 1973

[54] METHOD OF AND DEVICE FOR PHOTOMETRICALLY SORTING LUMPY MINERALS

[75] Inventors: Diethard Keitel; Heinz Weinold; Rold Schorlemer, all of Dornap, Germany

[73] Assignee: Rheinisch-Westfalische Kalkwerke AG, Dornap, Germany

[22] Filed: May 24, 1971

[21] Appl. No.: 146,120

[52] U.S. Cl............... 209/111.6, 356/178, 356/186
[51] Int. Cl. ........................................... B07c 5/342
[58] Field of Search ..................... 209/111.6, 111.7, 209/178; 356/186

[56] References Cited
UNITED STATES PATENTS

| | | | |
|---|---|---|---|
| 3,060,790 | 10/1962 | Ward | 209/111.6 X |
| 3,066,797 | 12/1962 | Fraenkel | 209/111.6 |
| 3,052,353 | 9/1962 | Pritchett | 209/111.7 X |
| 3,497,304 | 2/1970 | Berube | 356/178 |

*Primary Examiner*—Richard A. Schacher
*Attorney*—Walter Becker

[57] ABSTRACT

A method and apparatus for sorting articles, such as lumps of limestone and dolomite that differ in color. Each article is illuminated and the light reflected therefrom is directed to a pair of photocells, each having a filter for passing a respective frequency of light. A quotient is derived from the signals generated in the photocells and the quotient is employed for actuating an ejector when the derived quotient is different from that desired.

10 Claims, 3 Drawing Figures

METHOD OF AND DEVICE FOR PHOTOMETRICALLY SORTING LUMPY MINERALS

The present invention relates to a method of and device for sorting lumpy minerals, such as dolomite and lime stone, according to their color.

Sorting methods and devices of this type are known. Generally, according to these known methods and devices, the objects to be sorted freely fall through a polygonal chamber the interior of which is provided with reflecting walls. By means of lamps provided inside the chamber, the respective objects are illuminated. The light reflected by the objects is observed by photoelectric measuring devices. These measuring devices are preceded by filters of respectively different color. For purposes of conveying the light reflected by the objects to be sorted, a lense attachment, a lense system and a light guiding element are necessary. Since the distance from the respective object to the photoelectric measuring device may with larger objects materially vary, this varying distance frequently causes variations in the intensity of the reflected light which variations in intensity may exceed the measuring value proper by a multiple.

Furthermore, it has been suggested to illuminate the objects with diffuse light from a side which is located opposite to the measuring station. In such an instance the transporting chute must consist of a light transparent material which during the rough handling in a stone quarry may easily soil. The employed optical system furthermore does not materially eliminate the great influences of errors in distance and due to changing surface quality.

With almost all heretofore known sorting devices, the signals generated in a photoelectric measuring device are amplified by an amplifier and are then conveyed to an electric comparator. This comparator compares the signals with a reference voltage and in conformity with this comparison controls a separating device for removing the object to be sorted out. At any rate, also the signal is a difference in which the mentioned influence, such as distance errors and surface quality, are contained.

It is, therefore, an object of the present invention to provide a method of and device for photometrically sorting lumpy minerals, which will overcome the above mentioned difficulties and drawbacks.

It is another object of this invention to provide a method and device as set forth in the preceding paragraph which will eliminate the measuring errors due to variations in the illumination, in the distance, and in the different surface qualities.

It is still another object of this invention to provide a method of and device for the purpose above described which will be suitable for sorting mineral pieces which differ only slightly in color, such as lime stone and dolomite, which pieces could heretofore be separated or sorted from each other only under considerable difficulties.

These and other objects and advantages of the invention will appear more clearly from the following specification in connection with the accompanying drawings, in which.

The method according to the present invention is characterized primarily in that from the intensities of the two discrete wave length ranges of the light reflected by an object, a quotient is formed by electric means the output signals of which control an ejecting device known per se. According to a particularly advantageous design of the device according to the invention, each object is measured a plurality of times and the ejecting device is actuated only when the total of the individual signals exceeds a previously set number of successive pulses.

The present invention is based on the following considerations and tests. The spectra of a metallic filament lamp and of two objects differing only slightly in color from each other, for instance a gray lime stone and a brown dolomite, are measured by a spectrometer. These spectra nearly coincide with each other or cover each other. Merely in a certain range, one stone reflects less light than the other. With a non-filtered photo conductive cell (Fotowiderstand), this slight difference cannot be detected. In conformity with the invention, two ranges of the spectrum, which have to be predetermined accordingly for each mixed color, are by means of color filters filtered out and are measured as to their intensity whereupon by electric means the quotient of both intensities is formed. The variations in illumination, the distance errors and the different surface qualities eliminate themselves in the quotient inasmuch as both photo conductive cells simultaneously measure the same areas on the respective object and thus register only the color. The quotient of both intensities then represents a measurement for the difference in color of the two objects which difference is to be determined.

The device for carrying out the method according to the invention measured two identical photoelectric measuring devices which are located adjacent to each other and in front of which there is respectively provided a color filter. The photoelectric measuring devices together with the color filters form a measuring head which is protected against side light and dust by means of a lense attachment or a prismatic body of transparent material. Above the measuring head there is provided a reflector which by means of two lamps each generates a cross light which is additionally diffused by the interior wall of the reflector. The objects to be sorted out are now moved on a conveyor belt beneath the reflector while the intensity of the light reflected by said objects is measured.

For purposes of increasing the throughput, it is advantageous simultaneously to provide a plurality of parallel passages separated from each other by partitions, while above each passage there is provided a measuring head with a reflector. At the end of the conveyor belt there is advantageously provided an ejecting device for each passage.

Figure 1:
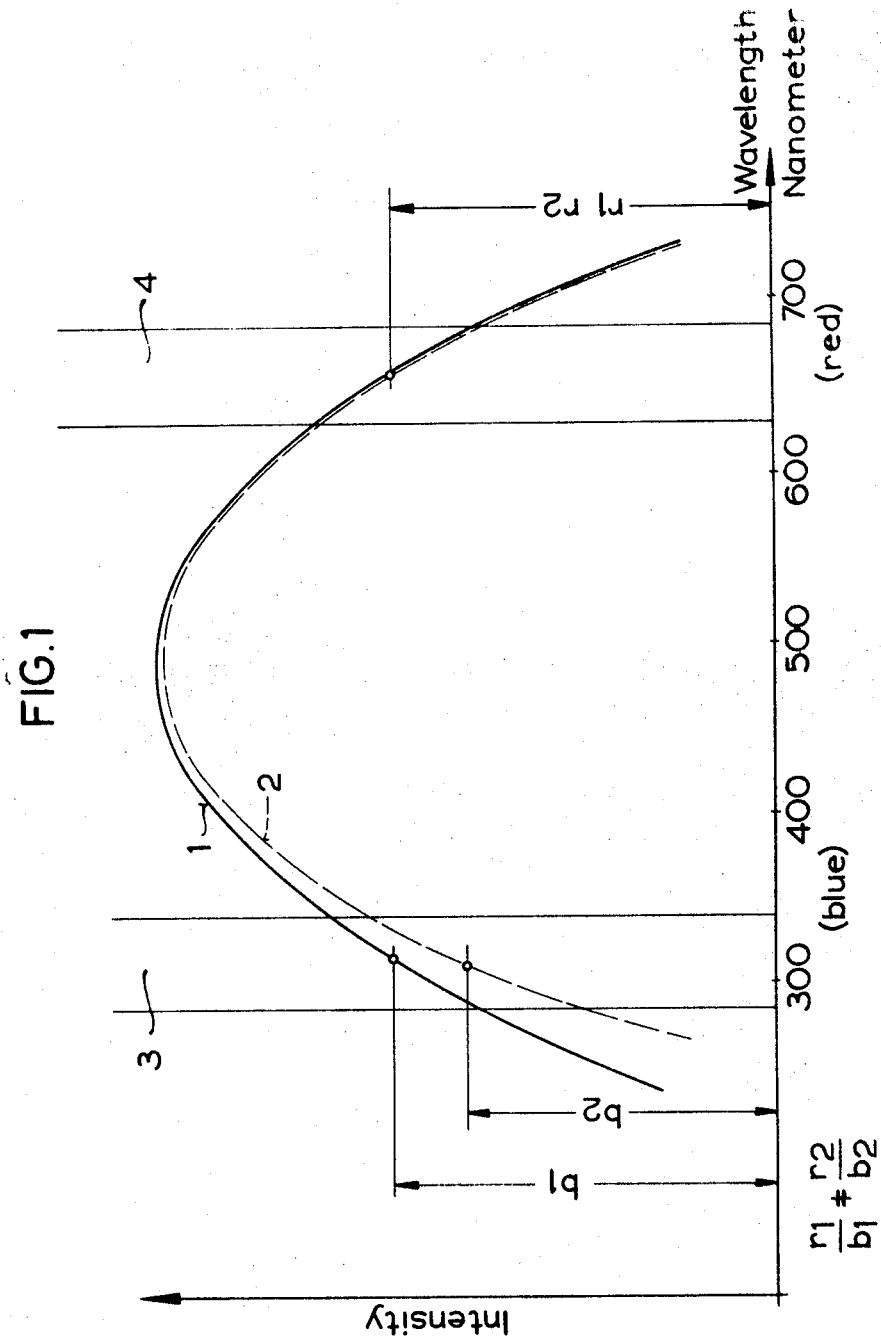
FIG. 1 illustrates the spectra of two mineral pieces which differ only slightly in color from each other.
Figure 2:
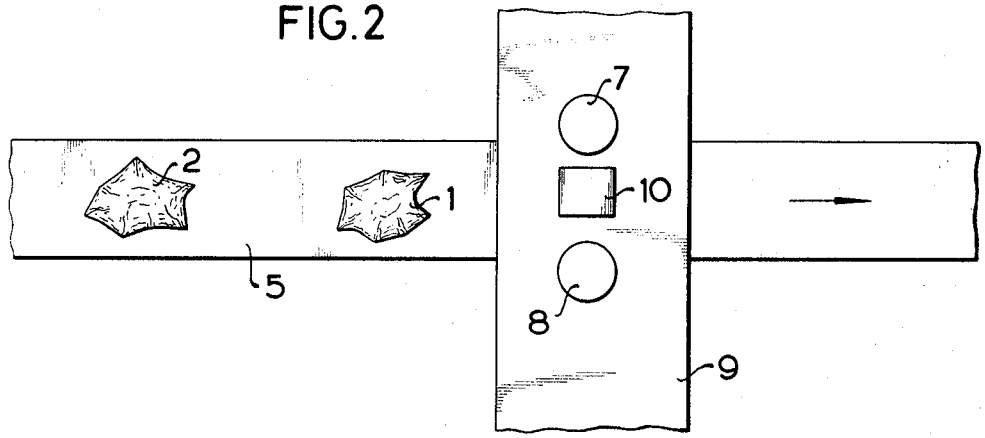
FIG. 2 is a top view of a diagrammatically illustrated device according to the invention for sorting mineral pieces.
Figure 3:
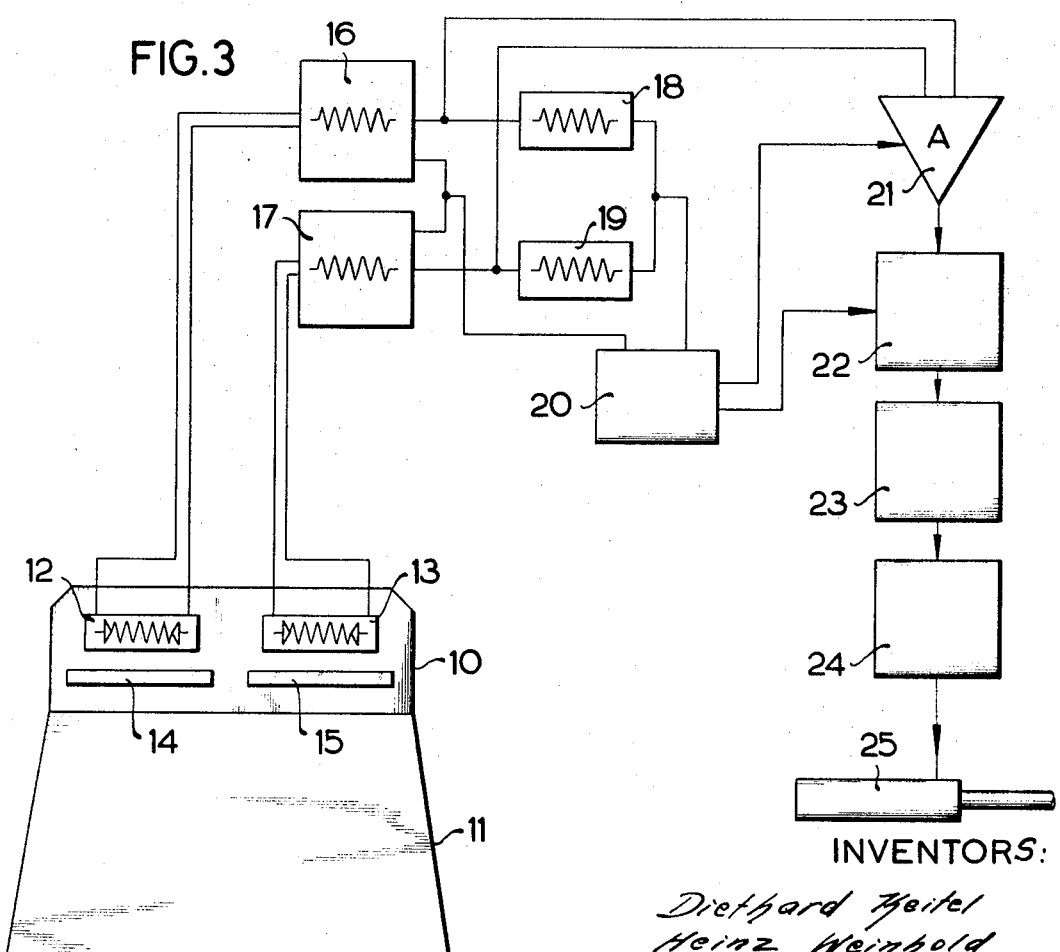
FIG. 3 is a block diagram of a suitable device according to the invention.

Referring now to the drawings in detail, FIG. 1 illustrates a coordinate system with the wave length of the reflected light plotted on the abscissa and with the intensity of the light plotted on the ordinate. In this coordinate system, the spectra of a gray stone 1 and a brown stone 2 nearly cover each other. Merely in the range 3 there exists a difference as will be evident from the magnitude of the intensity flanks $b_1$ and $b_2$, whereas in the range 4 the intensity flanks $r_1$ and $r_2$ are nearly identical. The two ranges 3 and 4 are now filtered out and measured as to their intensity whereupon by electric means from both intensity flanks $b_1$, $b_2$ and $r_1$, $r_2$ the quotient is formed. It will be apparent that $r_1/b_1 \neq r_2/b_2$.

The differently colored objects, for instance the gray lime stone 1 and the brown dolomite stone 2, are by means of a conveyor belt 5 conveyed beneath a reflector 9 which by two lamps 7, 8 each generates a cross light which is further diffused by the inner wall of the reflector 9. With regard to the term "cross light," it will be appreciated that in order to fully illuminate a rough surface so that it will be free of shadows, it is necessary that the light comes in from two different sides, i.e., that "cross light" is present. In the device according to the invention, the measuring unit is arranged vertically above the object to be measured whereas the lamps are located to the left and right of the measuring unit. More specifically, below the reflector 9 there is provided a measuring head 10 which is protected against side light and dust by an attachment 11. In the measuring head 10 there are provided two photo conductive or electric cells 12, 13 in front of which is located a color filter glass each 14, 15 for filtering out the two ranges 3 and 4. The two photo conductive cells 12, 13 are arranged together with additional resistor cells 16, 17 which serve for limiting the control range, and with two further resistors 18, 19 so as to form a complete bridge. This bridge circuit is fed from a source 20 of alternating current. The bridge output voltage feeds in its turn an amplifier 21 at the output end of which occurs a rectangular or square wave voltage the phase location of which is dependent on the quotient of the bridge circuit. In this connection it may be noted that the said bridge output voltage is still sine-shaped, but by the successively arranged differential amplifier (amplifying factor at least 50,000) it is amplified and limited so that a rectangular or square wave voltage is formed. By means of a gate circuit 22 moving synchronously with the alternating voltage source 20, only one half wave is filtered out whereas the second half wave feeds an integration circuit. The voltage-time surface of the integration circuit serves for identifying the material to be checked. Depending on the polarity of the integrator output voltage, in a slide register 23 serving as delaying conductor there is offered an O (rejecting) or an L (accepting). The rhythm frequency of the slide register 23 is brought into tune with the speed of the conveyor belt 5. In this instance, the sorting operation is initiated precisely when the material to be sorted reaches the end of the belt. The last outlets of the slide register 23 feed an addition circuit 24 with adjustable control shaft. By a suitable tuning of the rhythm frequency, the register length and the belt velocity, the ejecting device 25 can be actuated.

It is, of course, to be understood that the present invention is, by no means, limited to the particular method and device set forth above but also comprises any modifications within the scope of the appended claims.

What is claimed is:

1. The method of photometric sorting non-uniformly colored coarse mineral articles such as lumps of limestone and dolomite of changing form which differ from each other both in color and in size which comprises: illuminating each said article to cause light to be reflected therefrom, filtering the reflected light to extract at least two frequencies therefrom whereby the intensities of at least two discrete wave length ranges of light reflected from each said article become measured several times, separately detecting the extracted frequencies and developing electrical signals in conformity with the intensity of the respective extracted frequency, forming a quotient from a sum of the individual signals pertaining to each article, and developing a further output signal to control sorting out of the coarse articles in conformity with the said quotient only when the sum of the individual signals exceeds a preset number of sequential impulses.

2. The method according to claim 1 which includes conveying the articles on a conveyor to a receiving station, effecting said illumination of the articles continuously during conveying thereof, and deflecting from the receiving station those articles from which a said quotient is derived different from the said quotient derived from the articles desired in said receiving station.

3. The method according to claim 1 in which said extracted frequencies are respectively detected in arriving at the said quotient pertaining to the respective article.

4. The method according to claim 1 in which said articles are illuminated by light from metal filament lamps.

5. An apparatus for sorting coarse articles, such as lumps of limestone and dolomite, which differ from each other both in color and size which comprises: first means for supporting the article, second means for illuminating said articles, a pair of identical photosensitive elements, a filter between each said element and said illuminated article adapted to pass a respective frequency of the light reflected from said illuminated article, each said photosensitive element being adapted to develop a signal in conformity with the intensity of the light falling thereon from the respective filter, and circuit means supplied by said signals and operable to develop a further sorting signal in conformity with the quotient of the said signals supplied thereto.

6. An apparatus according to claim 5 which includes means shielding said photosensitive elements and filter from extraneous light.

7. An apparatus according to claim 5 in which said second means is on the opposite side of said photosensitive elements and filter from said illuminated article and comprises a pair of lamps arranged to generate a cross light.

8. An apparatus according to claim 7 which includes reflector means operable to diffuse the light from said lamps.

9. An apparatus according to claim 5 in which said first means is which conveyor, a receiving station to which said conveyor conveys articles, ejector means operable to deflect articles from said receiving station, and means for actuating said ejector means and operable in response to the development of a said further signal corresponding to the said quotient derived from an unwanted article for causing said ejector means to deflect the said unwanted article.

10. An apparatus according to claim 9 in which said conveyor defines at least two parallel paths for articles, an ejector means for each said path, and respective means for each path for developing said further signals.

* * * * *